United States Patent

[11] 3,626,264

[72] Inventors Martin O. Halfhill; Frank J. Sordello, both of San Jose, Calif.
[21] Appl. No. 851,695
[22] Filed Aug. 20, 1969
[45] Patented Dec. 7, 1971
[73] Assignee Information Storage Systems, Inc. Cupertino, Calif.

[54] VELOCITY SERVOSYSTEM
5 Claims, 2 Drawing Figs.

[52] U.S. Cl. .......... 318/331, 307/31
[51] Int. Cl. .......... H02p 5/16
[50] Field of Search .......... 318/317, 327, 331, 345, 20.821, 20.835, 331; 307/31

[56] References Cited

UNITED STATES PATENTS

| | | | |
|---|---|---|---|
| 2,905,876 | 9/1959 | Hillman | 318/331 |
| 3,027,505 | 3/1962 | Auld, Jr. | 318/331 |
| 3,309,596 | 3/1967 | Limley | 318/331 |
| 3,350,616 | 10/1967 | Greening | 318/331 |
| 3,260,912 | 7/1966 | Gregory | 318/20.821 |
| 3,383,578 | 5/1968 | Lewis | 318/331 |
| 3,436,635 | 4/1969 | James | 318/331 |
| 3,450,973 | 6/1969 | Tobey | 318/345 |
| 3,465,227 | 9/1969 | Ivie | 318/345 |

*Primary Examiner*—Bernard A. Gilheany
*Assistant Examiner*—Thomas Langer
*Attorney*—Robert B. Crouch

ABSTRACT: A velocity servocircuit for retracting the access mechanism of a disk storage drive independently of the normal position servo, including a summing amplifier connected to deliver a motor drive signal to the access motor, means providing a velocity command input to the amplifier from a signal source and means providing a velocity feedback to the amplifier derived from the back EMF of the motor.

INVENTOR.
Martin O. Halfhill
Frank J. Sordello
BY Robert B. Crouch

VELOCITY SERVOSYSTEM

BACKGROUND

A conventional disk storage drive includes an array of read/write heads mounted on an access mechanism for movement radially of a stack of rotating recording disks. The precision tolerances required in positioning the read/write heads relative to the disk surfaces give rise to a potential for damage to the heads and/or disks during emergency conditions and necessitate that provision be made for a variety of contingencies. In a typical disk storage drive the read/write heads are mounted in sliders which are individually supported on a film of boundary layer air carried by the rotating disks. Any reduction in the speed of rotation of the disks correspondingly reduces the ability of the air film to support a slider adjacent the disk surface until ultimately the slider comes into contact with the disk. Accordingly, some provision must be made for moving the read/write heads out of recording relationship with the disks during emergency condition, such as a power failure, to avoid damage to the heads and/or disk surfaces. Various approaches, involving both mechanical and electrical devices, have been proposed for retracting the access mechanism during emergency conditions, but to date these have envisaged movement of the access mechanism at an undefined, but usually the maximum, velocity. Since the access mechanism is retracted to a home position where it bears against a mechanical stop, the prior known devices operating at a maximum uncontrolled velocity inherently produced the likelihood of damage to, or misalignment of, the mechanical parts of the access mechanism. The access mechanism moving at an uncontrolled velocity also poses a safety hazard to personnel servicing the drive.

INVENTION

The present invention avoids the shortcomings of the prior known devices by provision of an inexpensive and reliable system for controlling the velocity of the access mechanism during withdrawal under emergency conditions, so that the read/write heads are retracted at the normal velocity. This is accomplished in the present invention by provision of a velocity servosystem, including:

a summing amplifier connected to deliver a motor drive signal to the access mechanism drive motor;

means providing velocity command signal to the amplifier from a signal source;

and means for providing a velocity feedback to the amplifier derived from the back EMF of the motor.

Figure 1:
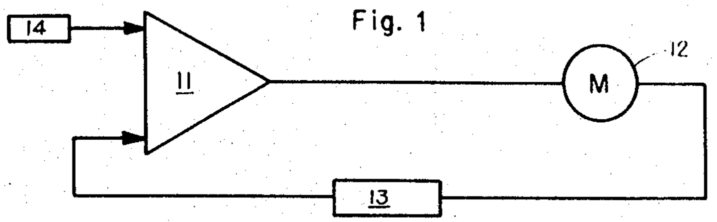
Figure 2:
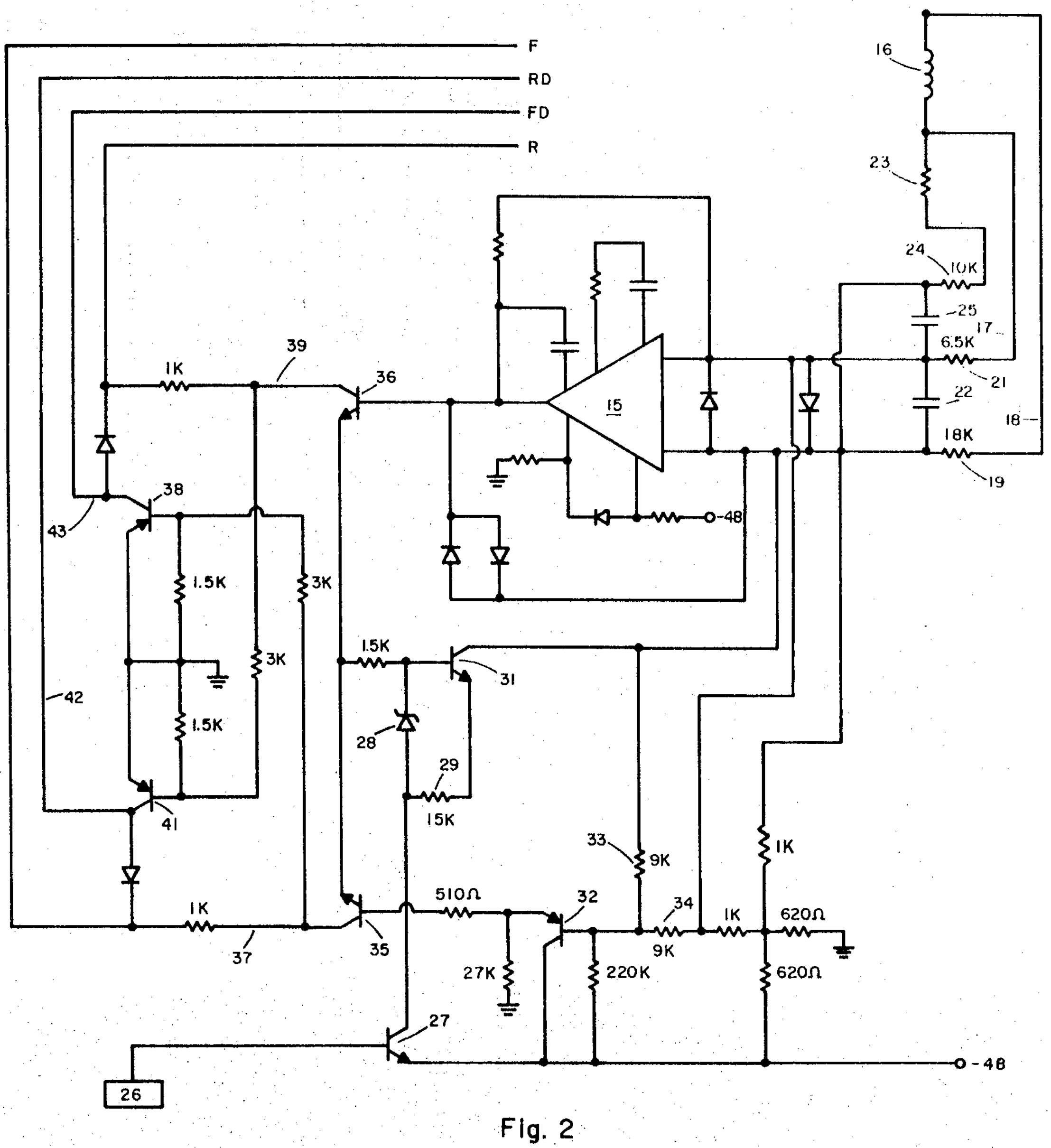

Other objects and many of the attendant advantages of this invention will be readily appreciated as the same becomes better understood by reference to the following detailed description when considered in connection with the accompanying drawing wherein;

FIG. 1 is a block diagram of a servosystem according to the present invention; and FIG. 2 is a circuit diagram of a preferred embodiment of the present invention.

As shown in FIG. 1 of the drawing, the present invention includes a summing amplifier 11 connected to deliver a motor drive signal to a motor 12. A signal-modifying means 13 is connected across the moving coil of the motor to sense the back EMF of the motor. The means 13 develops a velocity feedback signal from the motor EMF and supplies it as an input to the summing amplifier. The other input to the summing amplifier is a velocity command signal derived from a suitable source 14. In this system the summing amplifier develops a motor drive signal which is proportional to the difference between the velocity command input and the velocity feedback and in a direction dependent upon the polarity of the difference. The motor drive signal will drive the motor until the velocity feedback signal balances the velocity command signal as in a conventional closed loop velocity servosystem.

Referring to FIG. 2 of the drawing, a preferred embodiment of the system of the present invention is illustrated as a safety unload circuit for retracting the access mechanism of a disk storage drive under emergency conditions. This system is separate from the position servo utilized to position the access mechanism during normal operation of the disk drive and it will function only in case of an emergency condition when the position servo is inoperative. Such an emergency may arise due to failure of one or more of the power supplies to the position servo, failure of electrical components or transducers in the position servo during servicing of the disk drive. The circuit of FIG. 2 includes a summing amplifier 15 which is a type 709-Fairchild operational amplifier with associated feedback and summing resistors. The movable coil of a voice coil motor is shown at 16 and is connected by leads 17 and 18 through a filter consisting of resistors 19 and 21 and a capacitor 22 to the input of the summing amplifier. A resistor 23 is connected in series with coil 16 and is connected through a filter consisting of a resistor 24 and a capacitor 25 to lead 18 and to an amplifier bias source consisting of a pair of 620-ohm resistors and a −48-volt power source as shown.

A suitable means for detecting an unsafe condition in the disk storage drive and generating a safety unload signal in response to the condition, is illustrated at 26. Means 26 is connected through a transistor 27 to the −48-volt power source and through a 6-volt zener diode 28, a 15 kΩ resistor 29 and a transistor 31 to lead 18. A transistor 32 is connected as an emitter follower and receives its input bias through a pair of 9 kΩ resistors 33 and 34 across the leads 17 and 18. A pair of transistors 35 and 36 are coupled together to form a differential amplifier and are individually connected to the emitter follower 32 and the output of the summing amplifier respectively. The output of transistor 35 provides a forward signal on lead 37 and is also connected to a transistor 38. The output of transistor 36 provides a reverse signal on lead 39 and is also connected to a transistor 41. The leads 37 and 39 and leads 42 and 43 from the outputs of transistors 39 and 41 are connected to a bridge circuit (not shown) for controlling the velocity and the direction of drive of the voice coil motor.

OPERATION

Movement of the coil generates an EMF which is directly proportional to the velocity of movement of the coil. However, a measurement of the EMF taken across the coil also includes the IR drop across the coil and an inductive kick which is generated whenever the motor current is switched. The signal taken off on leads 17 and 18 includes the EMF, IR drop and inductive kick. The inductive kick or switching spike at the motor, is filtered out by the low-pass filters made of of capacitors 22 and 25 and resistors 19 and 21 and 24. The IR drop is removed by sensing the IR drop across resistor 23 and then adding it algebraically to the total signal on leads 17 and 18. In this regard the circuit connections should be such that the IR drop across resistor 23 is of opposite polarity to the IR component of the total signal across the coil, so that the two will cancel each other. The resultant signal on leads 17 and 18 is the EMF generated by the coil 16 which is directly proportional to the velocity of movement of the coil. The value of the resistor 23 is selected to correspond to the resistance of the coil, so that the IR drop can be effectively cancelled.

Upon occurrence of an emergency condition the signal means 26 generates a safety unload signal which activates transistor 27 and connects the −48-volt power source to the zener diode 28. The zener diode activates transistor 31 and produces a voltage of 6 volts across the resistor 29 which, allowing for circuit losses, produces a current of approximately 300 microamperes which is applied through transistor 31 to lead 18 to supply a velocity command signal to the summing amplifier. At the same time the voltage applied to the zener diode 28 produces an emitter biasing voltage for the transistors 35 and 36. An output from the summing amplifier activates transistor 36 producing a reverse signal on lead 39. The signal on lead 39 activates transistor 41 to emit a reverse-drive signal on lead 42 and clamp lead 37 to ground, thus blocking any forward signal over lead 37 to the bridge circuit. The motor thus drives the access mechanism in the reverse direction at a controlled speed, i.e. approximately 10 inches per second, which corresponds to the approximately 300 $\mu$ applied to lead 18.

The emitter follower 32 is driven by the common mode level of input to the summing amplifier 15. The output of the emitter follower activates transistor 35 to produce a forward signal on lead 37, turnoff transistors 36 and 41 and activate transistor 38. Transistor 38 produces a forward-drive signal on lead 43 and clamps lead 39 to ground to prevent any reverse signal to the bridge circuit. In this condition the motor drives the access mechanism in the forward direction until balance is restored between the velocity command input and the velocity feedback to the summing amplifier. When the difference signal of the inputs to the summing amplifier drops to that corresponding to the 300 $\mu$a. velocity command, transistor 35 is turned off, thus interrupting the forward-drive signals from transistors 35 and 38.

In the circuitry depicted in FIG. 2, the velocity of the motor can be set at the desired level by the selection of the proper values for the zener diode and resistor 29. This system is intended to function only in case of an emergency condition in the disk drive and it depends only upon the —48-volt power supply. In the event the —48-volt power supply fails, the system will function long enough to retract the access mechanism, since there is sufficient power stored in the capacitors of the filters to drive the motor far enough that the read/write heads will clear the disks.

The circuitry shown is suitable for operation at a predetermined velocity. However, the circuitry can be adapted for general use as a velocity servosystem by connection of a variable voltage supply in place of the fixed zener voltage. In the latter case the level of the motor drive signal produced by the summing amplifier can be varied as desired to drive the motor at corresponding velocities. Due to the velocity feedback signal the circuit will stabilize at the velocity corresponding to the voltage set on the variable power supply.

Obviously many modifications and variations of the present invention are possible in the light of the above teachings. It is therefore to be understood that within the scope of the appended claims, the invention may be practiced otherwise than as specifically described.

We claim:

1. A velocity servosystem for a reversible access mechanism drive motor, comprising:

a summing amplifier having an output connected to deliver a motor drive signal to the drive motor in the event of an emergency power failure;

power failure detecting means providing a velocity command signal to the summing amplifier upon the occurrence of a power failure for operating said motor in a reverse direction thereby generating a motor back EMF which is proportional to the velocity of movement of said motor;

means electrically connected uninterruptedly to said motor for applying said generated back EMF to said summing amplifier; and emitter follower means receiving said velocity command signal and said back EMF for halting the reverse movement of said motor and producing a forward drive signal effecting movement of said motor in the forward direction;

said forward drive signal continuing without interruption to drive said motor in the forward direction until said velocity command signal balances the back EMF being generated by said motor.

2. A velocity servosystem as set forth in claim 1, wherein:

said power failure detecting means includes a signal source and means for providing a predetermined voltage signal to the amplifier.

3. A velocity servosystem as set forth in claim 1, wherein:

said power failure detecting means includes a fixed voltage source and circuitry for providing a constant predetermined voltage to the summing amplifier for providing a constant predetermined voltage to the summing amplifier for driving the voltage at a limited velocity.

4. A velocity servosystem as set forth in claim 1, wherein:

said emitter follower means is driven by the common mode level of the summing amplifier inputs, and a differential amplifier is connected to the output of the summing amplifier and the output of the emitter follower means.

5. A velocity servosystem as set forth in claim 4, wherein:

said power failure detecting means includes means for applying a voltage to activate the differential amplifier and to generate a current and to switch the current into the summing amplifier as said velocity command signal.

* * * * *